(12) United States Patent
Bellas et al.

(10) Patent No.: US 6,868,123 B2
(45) Date of Patent: Mar. 15, 2005

(54) PROGRAMMABLE MOTION ESTIMATION MODULE WITH VECTOR ARRAY UNIT

(75) Inventors: Nikolaos Bellas, Chicago, IL (US); Malcolm Ryle Dwyer, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 650 days.

(21) Appl. No.: 10/006,464

(22) Filed: Dec. 7, 2001

(65) Prior Publication Data

US 2003/0174252 A1 Sep. 18, 2003

(51) Int. Cl.$^7$ ............................. H04N 7/12; H04N 5/14
(52) U.S. Cl. .................................. 375/240.16; 348/699
(58) Field of Search ................................. 348/699, 416, 348/409; 382/238, 236; 375/240.26, 240.24, 240.12

(56) References Cited

U.S. PATENT DOCUMENTS

| | | | |
|---|---|---|---|
| 5,081,575 A | * | 1/1992 | Hillis et al. .................. 710/317 |
| 5,099,325 A | | 3/1992 | Artieri et al. |
| 5,473,378 A | | 12/1995 | Tamitani |
| 5,512,962 A | | 4/1996 | Homma |
| 5,594,813 A | | 1/1997 | Fandrianto et al. |
| 5,608,656 A | | 3/1997 | Purcell et al. |
| 5,630,033 A | | 5/1997 | Purcell et al. |
| 5,652,625 A | | 7/1997 | Chen et al. |
| 5,838,392 A | | 11/1998 | Chen et al. |
| 5,901,248 A | * | 5/1999 | Fandrianto et al. ......... 382/236 |
| 5,905,542 A | | 5/1999 | Linzer |
| 5,953,458 A | | 9/1999 | Pirson et al. |
| 5,987,178 A | | 11/1999 | Anesko et al. |
| 6,104,836 A | | 8/2000 | Buckley et al. |
| 6,122,442 A | | 9/2000 | Purcell et al. |
| 6,160,850 A | | 12/2000 | Chen et al. |
| 6,298,438 B1 | * | 10/2001 | Thayer et al. ............... 712/226 |

OTHER PUBLICATIONS

Mark Querol, "STi 3220 Motion Estimation Processor Codec", SGS Thomson Microelectronics—Application Note, 1994, pp. 1–33.

"Summary of A436™ Parallel Video DSP Chips", Oxford Micro Devices—Rev. Jun. 26, 2001, pp. 1–8.

"DSP Selection Guide", Texas Instruments, May 2001, pp. 1–47.

K–M Yang, et al. "A family of VLSI designs for the motion compensation block–matching algorithm", *IEEE Transactions on Circuits and Sytems*, 36(10):1317–1325, Oct. 1989.

P.A Ruetz, et al. "A high–performance full motion video compression chip set", *IEEE Transactions on Circuits and Systems for Video Technology*, 2(2):111–121, Jun. 1992.

Thomas Komarek and Peter Pirsch, "Array architectures for block–matching algorithms", *IEEE Transactions on Circuits and Systems*, vol. 36, No. 10, Oct. 1989, pp. 1301–1308.

* cited by examiner

*Primary Examiner*—Chris Kelley
*Assistant Examiner*—Behrooz Senfi

(57) ABSTRACT

A programmable motion estimation module for processing pixel values from a sequence of digital video images. The module includes a programmable microcontroller, scalar and control register files, arithmetic logic units, a direct memory access unit and a vector array processor. The vector array processor includes a series of processing elements, a memory subsystem for storing pixel values and a crossbar switch for distributing pixel values from the memory subsystem to the processing elements. The module provides a flexible platform that can be programmed to implement a variety of different Motion Estimation (ME) algorithms using an associated Instruction Set Architecture without the need to modify the hardware.

30 Claims, 8 Drawing Sheets

| 1 | 2 | 5 | 6 | 9 | 10 | 13 | 14 |
|---|---|---|---|---|----|----|----|
| 3 | 4 | 7 | 8 | 11 | 12 | 15 | 16 |

| 3 | 2 | 1 | 0 |
|---|---|---|---|
| 7 | 6 | 5 | 4 |
| A SW | B SW | C SW | D SW |
| 767 | 766 | 765 | 764 |
| 771 | 770 | 769 | 768 |
| 775 | 774 | 773 | 772 |
| E SW | F SW | G SW | H SW |
| 1535 | 1534 | 1533 | 1532 |
| 1539 | 1538 | 1537 | 1536 |
| 1543 | 1542 | 1541 | 1540 |
| I SW | J SW | K SW | L SW |
| 2303 | 2302 | 2301 | 2300 |
| 2307 | 2306 | 2305 | 2304 |
| 2311 | 2310 | 2309 | 2308 |
| M SW | N SW | O SW | P SW |
| 3071 | 3070 | 3069 | 3068 |
| 3075 | 3074 | 3073 | 3072 |
| A currMB | B currMB | C currMB | D currMB |
| 3135 | 3134 | 3133 | 3132 |
| 3139 | 3138 | 3137 | 3136 |
| E currMB | F currMB | G currMB | H currMB |
| 3199 | 3198 | 3197 | 3196 |
| 3203 | 3202 | 3201 | 3200 |
| I currMB | J currMB | K currMB | L currMB |
| 3263 | 3262 | 3261 | 3260 |
| 3267 | 3266 | 3265 | 3264 |
| M currMB | N currMB | O currMB | P currMB |
| 3327 | 3326 | 3325 | 3324 |
| 3331 | 3330 | 3329 | 3328 |
| W bound | X bound | Y bound | Z bound |
| 3423 | 3422 | 3421 | 3420 |

*FIG. 6*

PROGRAMMABLE MOTION ESTIMATION MODULE WITH VECTOR ARRAY UNIT

TECHNICAL FIELD

This invention relates to techniques and apparatus for carrying out motion estimation for real-time digital video compression.

BACKGROUND OF THE INVENTION

Block-based video compression standards such as H.261, H.263, MPEG1, MPEG2, and MPEG4 achieve efficient compression by reducing both temporal redundancies between video frames and spatial redundancies within a video frame. An intra-coded frame is self-contained and only reduces spatial redundancies within a video frame. Inter-coded frames, however, are predicted via motion compensation from previously coded frames to reduce temporal redundancies. The difference between the inter-coded video frame and its corresponding prediction is coded to reduce spatial redundancies. This methodology achieves high compression efficiency. Each video frame comprises an array of pixels. A macroblock (MB) is a group of pixels, such a 16×16 block. In the simplest approach, the difference between a macroblock in the current video frame and the corresponding block in the previous video frame would be encoded. This is inefficient because of camera motion and object motion. Instead, it is common to estimate how the image has moved between the frames. This process is called motion estimation. Since different parts of the image may move in different directions (e.g. if the camera is rotated), the motion estimation is performed for each macroblock in the current video frame. The task of Motion Estimation usually comprises comparing a macroblock in the current frame to a number of macroblocks from the previous frame and finding the one that is most similar. The spatial shift between the macroblock in the current video frame and the most similar macroblock in the previous video frame is denoted by a motion vector. The previous macroblocks are not just searched on macroblock boundaries. The motion vector may be estimated to within a fraction of a pixel, by interpolating pixel values from the previous video frame.

The task of Motion Estimation (ME) is the most computationally intensive in a video compression system and may account for as much as 80% of the complexity in current schemes. For real-time video coding, the ME unit may be required to perform billions of operations per second and requires a large memory bandwidth. Prior video systems have utilized hardwired Application Specific Integrated Circuit (ASIC) implementations. These meet the performance requirements of a video CODEC. However, the are only able to implement a limited set of algorithms. They lack the flexibility of a general purpose processor core, such a RISC core or a DSP core, and cannot be modified to execute other algorithms without major redesign. Other the other hand, general purpose processor cores, such RISC or DSP cores, are not well suited to applications mobile applications, such as wireless videoconferencing, digital video cameras, or 3G cellular devices, where low power consumption is required. Their general-purpose nature makes them inefficient compared to an ASIC, and more hardware resources are needed to achieve the same performance. An example is the TMS320C64x series of DSPs manufactured by Texas Instruments.

U.S. Pat. Nos. 5,594,813 and 5,901,248 describe the combination of a RISC controller with a scalar data processing path for video processing. No instruction set architecture is defined so the device does not have the capability to execute general-purpose control code. Further, a single arithmetic logic unit is used so a very high clock rate is needed for real-time video processing. In contrast, some ASIC devices, such as that described in "A family of VLSI designs for motion compensation block-matching algorithm", IEEE transactions on Circuits and Systems, Vol. 36, No. 10, October 1989, by Kun-Min Yang et al, use multiple processing elements to perform a number of operations in parallel, thus reducing the need for a high clock rate. However, ASICs, such the Sti3220 Motion Estimation Processor Codec from SGS Thomson Microelectronics, lack the flexibility to implement a variety of motion estimation algorithms.

A programmable chip incorporating a DSP, a 32b RISC processor and several motion estimation (ME) coprocessors is described in "A Summary of A336™/8/E Parallel Video DSP Chip" published by Oxford Micro Devices, Inc. The ME coprocessor of this device is accessible only through a single 'PixDist' instruction and requires both instructions and data to be issued to perform a computation. Its functionality is limited to the calculation of sum of absolute difference calculations from various memory locations, and so the device has limited flexibility.

There is therefore an unfilled need for a motion estimation apparatus that is flexible and has low power consumption.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 6 shows the memory configuration in linear mode for one embodiment of the present invention.

DETAILED DESCRIPTION OF THE INVENTION

Figure 1:
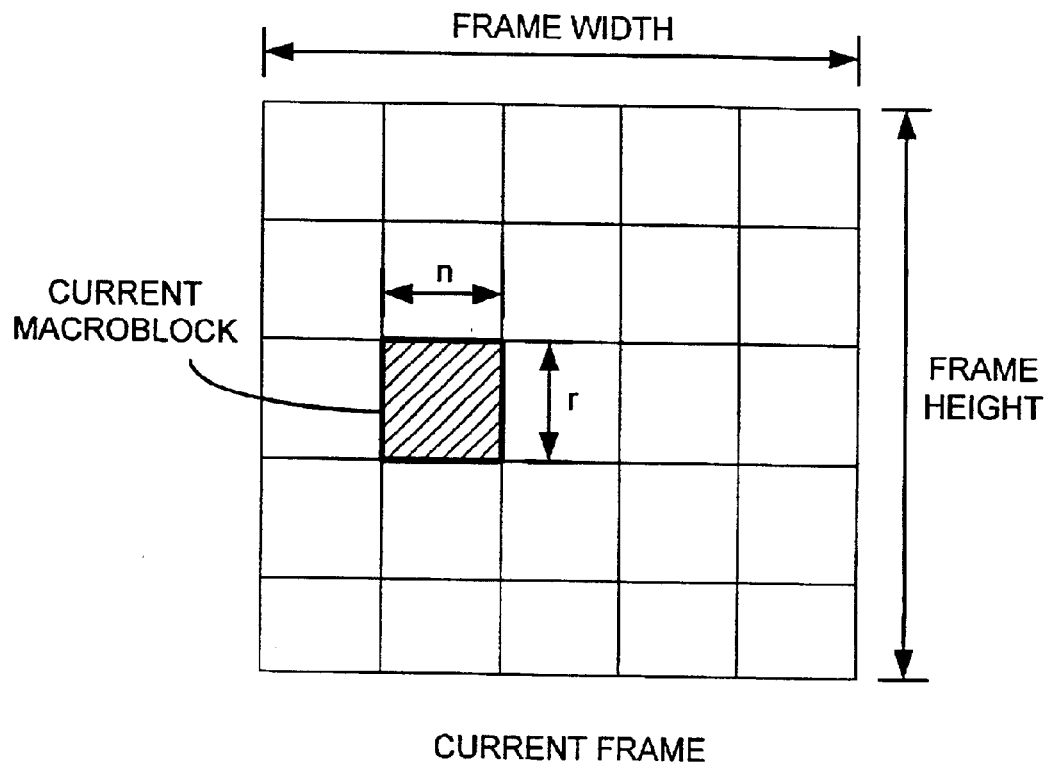
FIG. 1 shows the relationship between the current macroblock location and the search window.
Figure 1:
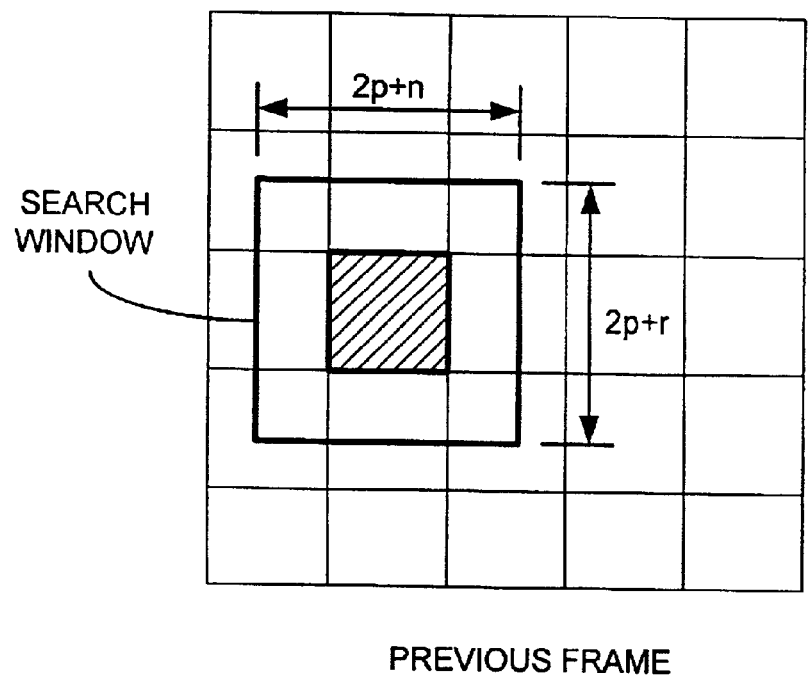

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The invention relates to a programmable, high-performance vector array module for motion estimation and the corresponding Instruction Set Architecture (ISA). The module provides a flexible platform that can be programmed to implement a variety of different Motion Estimation (ME) algorithms using the ISA without the need to modify the hardware. The architecture is optimized to achieve processing speeds comparable to an ASIC implementation.

Most of the ME algorithms are macroblock-based. That is, they operate on a macroblock of image data. For example, a 16×16 pixel macroblock of image data in the current frame may be predicted by a macroblock of data in the previous frame. It is important to note however, that the previous frame macroblocks that are searched are not just on macroblock boundaries. For a full search, the current macroblock is checked against macroblocks that begin at each pixel in the search window of the previous frame.

There are many different techniques for performing Motion Estimation. Search window size and shape, comparison computation, pixel accuracy, and block size are some of the things that vary between different motion estimation algorithms, and make a programmable solution desirable.

The search window is the area of the previous frame within which the search for the best matching block takes place. Most ME algorithms constrain their search for the best match in a rectangular area around the current macroblock. The upper diagram in FIG. 1 shows a frame of 25 macroblocks for a current digital image frame. Each macroblock is n pixels wide and r pixels high. The lower diagram in FIG. 1 shows a frame of 25 macroblocks for a previous digital image frame. In this example, the search window extends p pixels on each side of the macroblock, so the search window is 2p+n pixels by 2p+r pixels. For videoconferencing applications, this constraint does not create compression inefficiencies because the amount of motion between two successive frames is usually very small. The value p defines the search window size, where the search window extends p pixels to the top, bottom, left, and right of the current macroblock's location.

For a displacement vector (i,j), the distortion between two 16×16 macroblocks is defined by the following equation:

$$SoAD(i, j) = \sum_{m=0}^{15} \sum_{n=0}^{15} |Curr(m, n) - Prev(m + i, n + j)|$$

$$i, j \in [-p, p]$$

The chosen motion vector is the displacement (i,j) for which the SoAD(i,j) metric is minimum. The pseudocode for a full search algorithm is as follows:

```
for (i=0, i < FRAMEHEIGHT/16; i++) {
    for (j=0, j < FRAMEWIDTH/16; j++) {
        SoADopt(i,j) = +∞;
        for ( k = -p, k ≤ p; k++) {
            for ( l = -p, l ≤ p; l++) {
                SoAD = 0;
                for (m=0; m < 16; m++) {
                    for (n=0; n < 16; n++) {
                        SoAD += abs( Curr[i*16+m] [j*16+n]
                                - Old[i*16+k+m] [j*16+l+n]);
                    }
                }
                SoADopt(i,j) = min(SADopt(i,j), SAD);
            }
        }
    }
}
```

The instruction

```
SoAD += abs( Curr[i*16+m] [j*16+n]
        - Old[i*16+k+m] [j*16+l+n] );
``` which performs the operation, r=r+|a−b|, is repeated many times. For example, to perform motion estimation for all MBs in a CIF frame and range p, the operation is performed 16*16*(2*p)^2*396 times. This increases rapidly with the size of the search window.

In order to eliminate the high computational requirements of the full search method, researchers have devised ME algorithms that perform fewer computations without noticeable image quality degradation. The wealth of different methods to compute the SC necessitates a programmable architecture.

For maximum efficiency, it is important that the operation r=r+|a−b| be performed in a single clock cycle of the processor. The programmable vector array unit of the present invention includes a number of processing elements, each comprising inputs for receiving pixel values (a and b), a computation unit for calculating the absolute value of the difference between the pixel values, |a−b|, and an accumulator to perform the operation r=r+|a−b|. The accumulator includes a register for storing the accumulated value, r, and an adder for adding the accumulated value to the absolute value of the difference between the pixel values so as to obtain a new accumulated value.

Each processor element computes the sum of absolute differences between pixels from the current and the previous frame. The core of the PE is the |a−b| block, and the accumulator. They are used to compute the sum of absolute differences between a series of current pixels, and a series of search window pixels. At the end of a number of cycles, the accumulator will contain the sum of absolute differences between a current macroblock, and a search window macroblock. The computation that is done in one clock cycle by the PE is given by the following equation:

$$r=r+|a-b|$$

The element "a" can be either a pixel from the search window or the bilinear interpolation of two neighboring pixels from the search window (when half-pixel search is performed). The element "b" is a pixel from the current macroblock. The PE performs the operation in one clock cycle. This is important due to the required high bandwidth of the ME algorithm.

Figure 2:
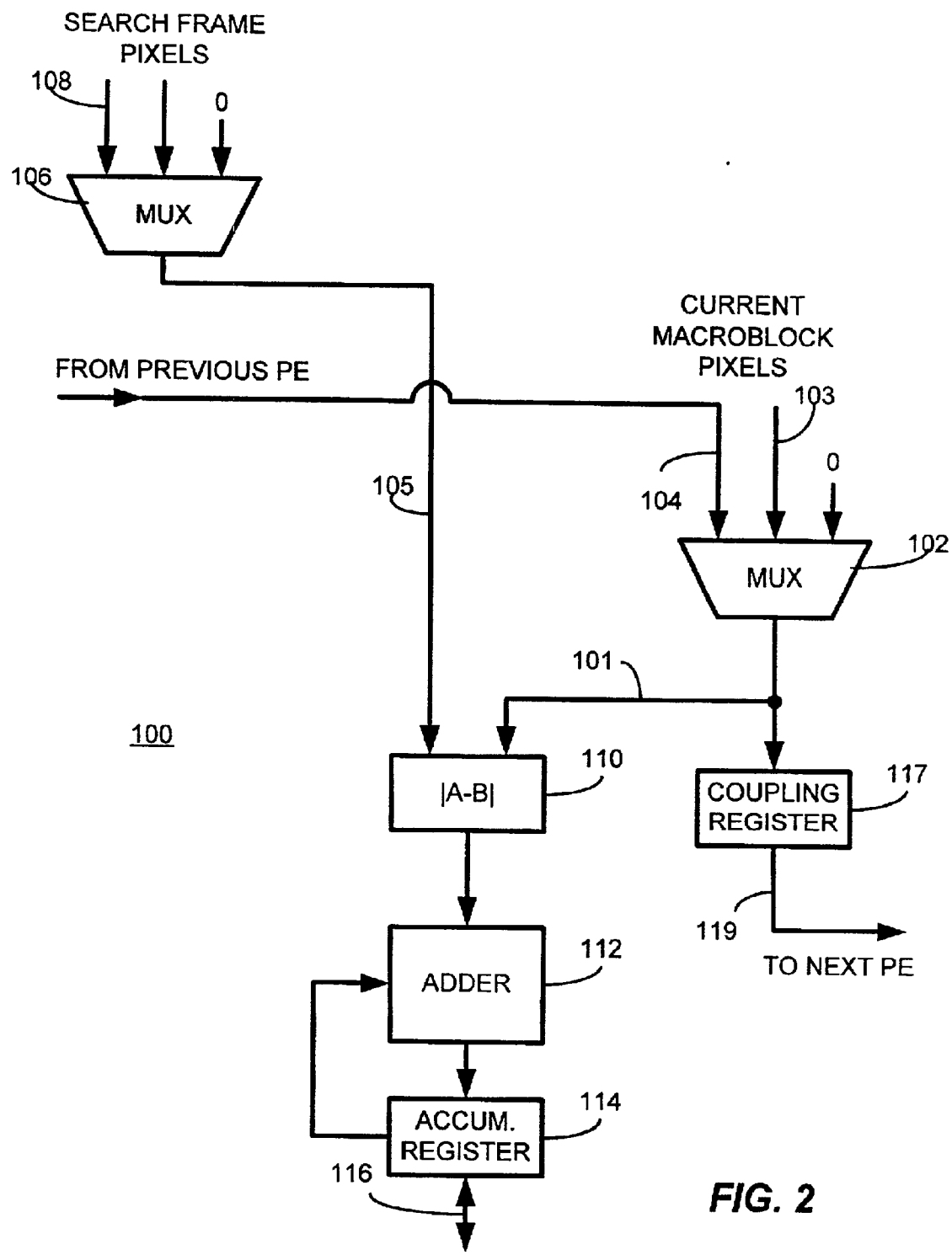
FIG. 2 is a block diagram of a Processing Element of an embodiment of the present invention.

The preferred embodiment of a processing element 100 is shown in FIG. 2. The processing element 100 has a first input 101 that takes signals from a multiplexer 102. The input to the multiplexer 102 is either a pixel value from a macroblock in the current video frame or the value zero. The pixel value may be acquired from one of two inputs, 103 or 104. As will be discussed later, input 103 is connected to a memory subsystem via a crossbar switch, while input 104 is connected to another processing element. The processing element also has a second input 105 that takes signals from a multiplexer 106. The input to the multiplexer 106 is either a pixel value 108 from the search window in the previous video frame or the value zero. The values of the first and second inputs, denoted by A and B respectively, are passed to computation unit 110 that computes the absolute difference value |A−B|. The absolute difference value is passed to adder 112 where it is added to the value stored in the accumulator register 114. The result of the addition is stored in the accumulation register 114. The accumulation register 114 may be read or written to by other elements through connection 116. In particular, the accumulation register 114 may be initialized through connection 116 and the final sum of absolute differences may be read from the register. The value of the pixel from the current macroblock may be passed to coupling register 117 and thereafter passed via connection 119 to another processing element. In this way, current macroblock data may be pipelined from one processing element to another.

The preferred embodiment of the motion estimation module is also capable of determining motion vectors accurate to half a pixel. This is achieved by use of a modified processing element containing additional hardware to compute interpolated pixel values, sometimes called virtual pixels. Bilinear interpolation is done by averaging two or four adjacent pixels. In the former case, the pixel a in the previous equation will be given by $a=(A+B+1)/2$, whereas, in the latter case, it will be given by $a=(A+B+C+D+2)/4$, where A, B, C, and D are integer pixel values. The addition of the values 1 and 2 respectively are to facilitate integer rounding of the result. Interpolation over four adjacent pixels may also be calculated as $a=\frac{1}{2}[(A+B+1)/2+(C+D+1)/2]$, i.e., as the average of two, two-pixel interpolations.

Figure 3:
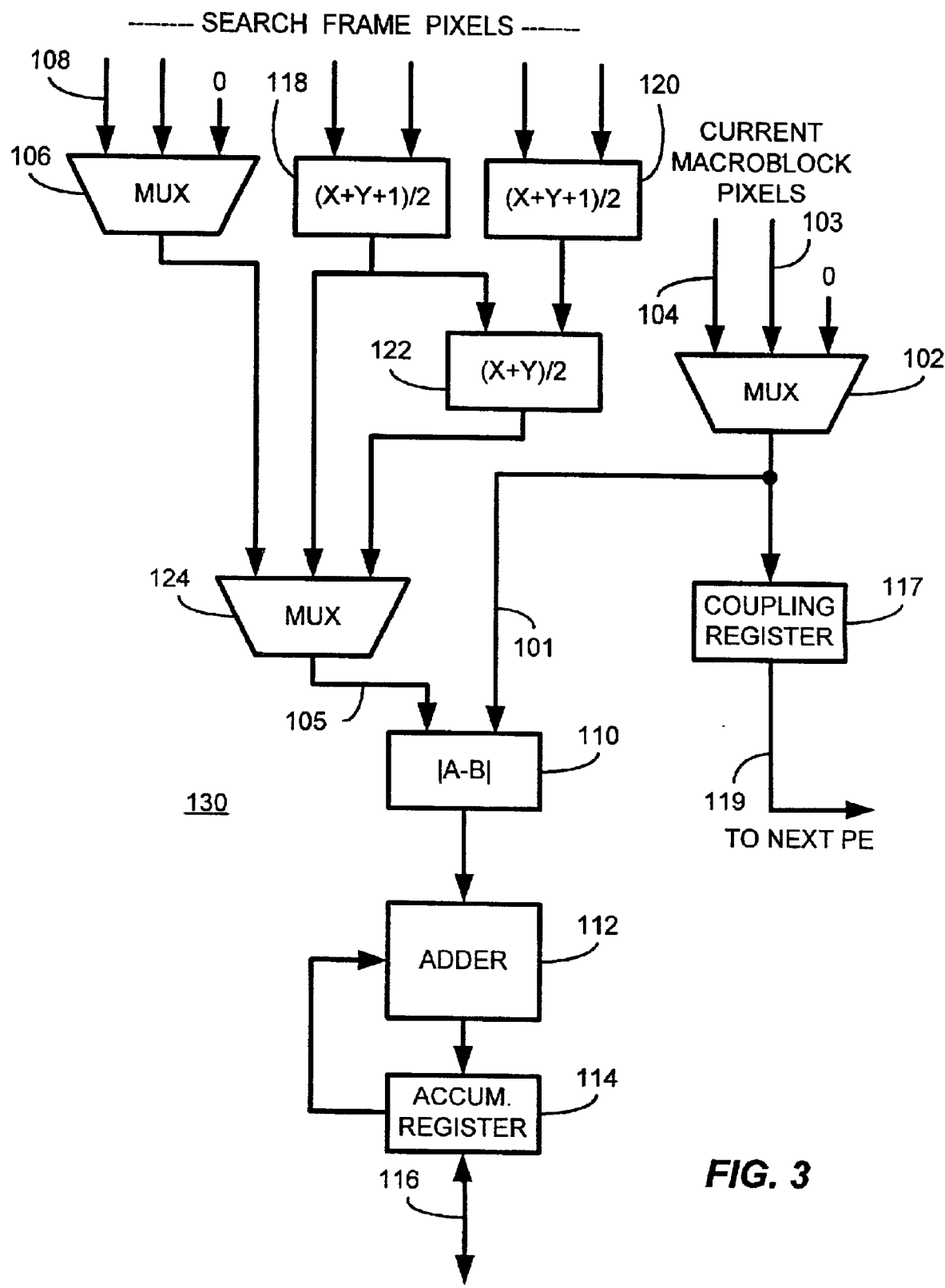
FIG. 3 is a block diagram of a further Processing Element of an embodiment of the present invention.
Figures 4, 8:
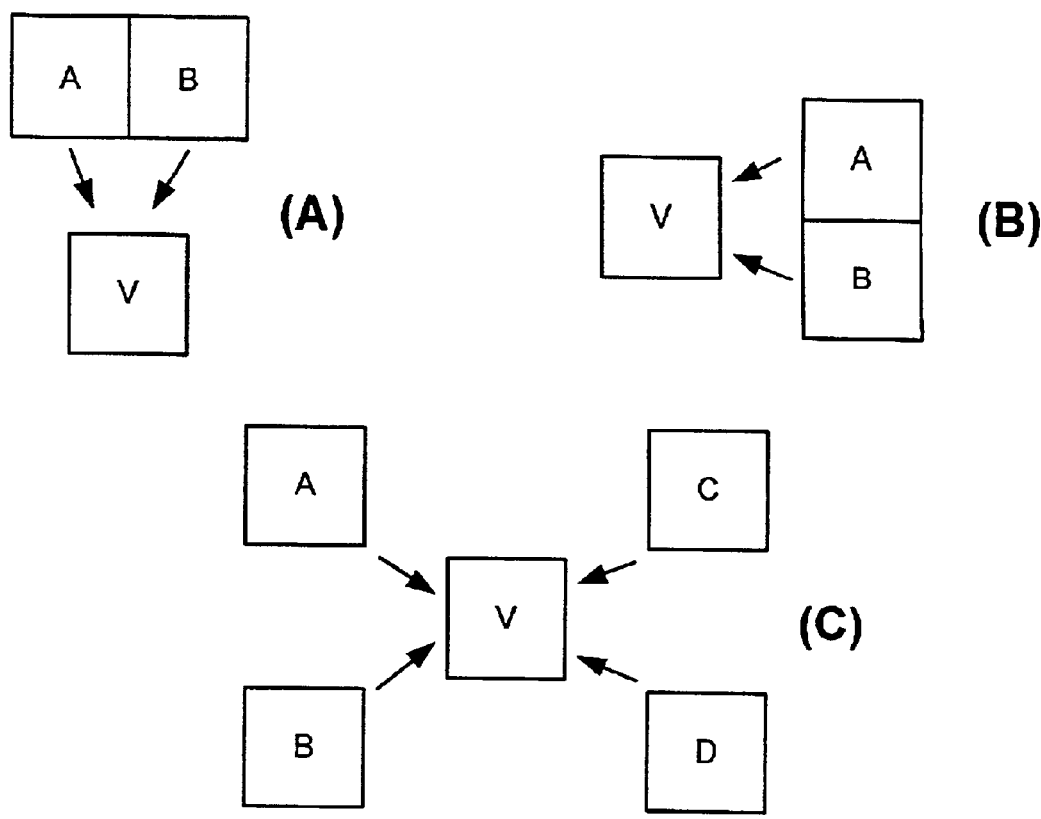
FIG. 4 shows the relative positions of pixels for the computation of a half pixel.
FIG. 8 shows the numbering scheme used for pixels.

A second, modified, version of preferred embodiment of a processing element 130 is shown in FIG. 3. This includes all of the components of the processing element 100, plus extra elements required for estimating fractional motion vectors. Computation units 118 and 120 receive pixel values from the search window and calculate the integer average $(X+Y+1)/2$. Computation unit 122 receives the outputs from units 118 and 120 and averages them according to $(X+Y)/2$. The second input 105 is the output from multiplexer 124. The multiplexer 124 is operable to select the output to be one of three inputs: the output from multiplexer 106, the output from computation unit 118 or the output from computation unit 122. The relative positions of the pixels for the computation of the half pixel are shown in FIG. 4. FIG. 4(A) shows a horizontal interpolation of two pixels, A and B. V denotes the interpolated or virtual pixel. FIG. 4(B) shows a vertical interpolation of two pixels. FIG. 4(C) shows an interpolation from a group of four adjacent pixels.

Figure 5:
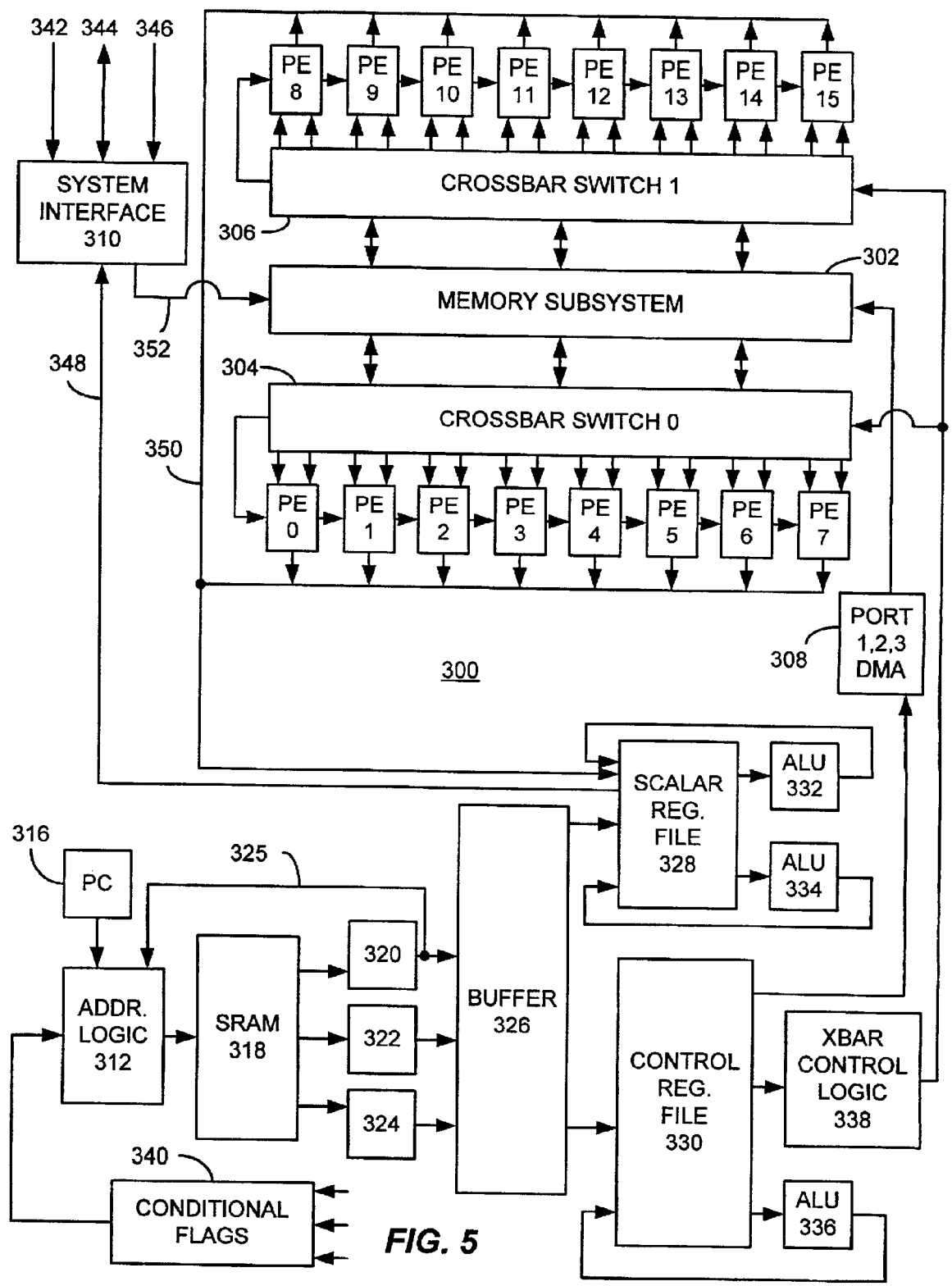
FIG. 5 is a block diagram of a Motion Estimation Module of an embodiment of the present invention.

FIG. 5 shows a top-level diagram of a programmable motion estimation module with a vector array unit in accordance with the preferred embodiment of the present invention. The data path of the module includes a systolic/vector array, that is used primarily for the computation of the Sum of Absolute differences (SoAD), and a scalar part that is equipped with register files and scalar functional units. The scalar part is mainly used for simpler scalar computations and program flow.

The systolic array consists of a number of Processing Elements (PEs) as described above with reference to FIG. 2 and FIG. 3. The preferred embodiment, shown in FIG. 5, has 16 Processor Elements, labeled as PE 0, PE 1, . . . , PE15. Processing Elements 0, 4, 8 and 12 are of the type shown in FIG. 3 for computing fractional motion vectors, while the remaining 12 PEs are of the simpler type shown in FIG. 2.

The memory subsystem 302 contains a number of SRAMs and is used to store pixel data from the previous and current frame. It is also used as an input and output buffer, and as a general-purpose "linear" memory to store 'scratchpad' data. It has a built-in layer of logic, the Virtual Memory Translation Unit (VMTU) which is used to present a 2-D interface to the programmer, and to simplify access to the SRAMs. The memory subsystem 302 is connected to crossbar switches 304 and 306 by three input/output channels, from which it can provide data to the vector array of processing elements, and can receive up to three independent addresses to read data from. The memory system can operate in two modes: a "pixel" mode in which the incoming addresses are the (x,y) coordinates of the desired pixel, and a "linear" mode in which the incoming addresses are absolute. The memory can be set to the appropriate mode via the control registers.

The direct memory access (DMA) unit 308 is used to generate the addresses of the incoming pixels automatically so that the programmer of the module does not do that explicitly. The generated addresses are passed to the memory subsystem 302. The DMA is programmable, and can generate addresses in different patterns, such as a linear scan of the memory, or a two-dimensional scan, etc. The functionality of the DMA is controlled through variables such as the initial memory address, the size of the stride, the size of the skip, etc. that are stored in registers in the control register file 330. The result is that the DMA can generate a variety of useful access patterns, and relieve the programmer from the tedious task of providing a new memory address every clock cycle.

Tightly coupled with the memory subsystem is a crossbar switch, shown in FIG. 5 as the two switches 302 and 304, that is used to distribute the pixels that are read from the memory to the PEs. The functionality of the crossbar switch is controlled by a crossbar control logic unit 338 that processes control bitmasks from the control registers. The crossbar switch provides a flexible interconnection between the PEs and the memory, so that a variety of algorithms can be implemented. In addition, the PEs are coupled together in a serial or pipelined manner, in which the coupling register of a processing element (117 in FIG. 2 and FIG. 3) is coupled to the multiplexer (102 in FIG. 2 and FIG. 3) of the adjacent processing element. This creates a data pipeline between PEs.

The motion estimation module contains two register files that are used for general purpose computation, and for storing control data for the vector array. The scalar register file 328 is equipped with two Arithmetic Logic Units (ALUs) 332 and 334 that can perform arithmetic operations, such as Add, Shift, Min, CondAdd, etc. Up to two instructions can be issued per clock cycle that read or write to a scalar register in the scalar register file 328. The control register file 330 is used to configure the memory system DMA unit 308, as well as the crossbar switches, 304 and 306, through crossbar control logic 338. The control registers in control register file 328 are dedicated to particular tasks, for example, storing the initial address from where the memory fetches pixel data, or storing the number of iterations that the vector array must perform, etc. The control register file 330 is also equipped with an ALU 336 that is used for general-purpose computation. In the preferred embodiment, the control register file contains 26, 16-bit registers and the scalar register file contains 32, 16-bit registers.

The programmer controls the functionality of the memory and the systolic array through bitmasks that can be manipulated using the functional units and the control register file 330. A series of instructions are defined in the Instruction Set Architecture (ISA) that allow the programmer to have full control on the functionality of the vector array and the scalar part. The programming model is a VLIW engine that can issue up to three instructions in parallel.

In the preferred embodiment shown in FIG. 5, the machine is organized as a three-stage pipeline with Instruction Fetch (IF), Instructions Decode (ID), and Execution and Write Back (EX). The EX stage is where the vector array and the ALUs are used to compute results and write them back to the register file or to the PEs. Since there are only three stages, an instruction that reads a register operand can be issued immediately before the instruction that produced the operand. The only exception to that is the conditional branch instruction which can be issued only two clock cycles after the conditional flags have been set (via the Cmp instruction). The vector array is also part of the EX stage, but it cannot necessarily function simultaneously with the ALUs of the scalar part of the data path.

The memory address of each instruction is determined in the address logic unit 312, in accordance with the value of the program counter 316 and the values of conditional flags 340. The values of the conditional flags are determined by operation of the ALUs. The connection the ALUs and the conditional flags is omitted in FIG. 5 for clarity. The retrieved instruction is stored in micro-instruction SRAM 318. The instructions are decoded by decoders 320, 322 and 324, that decode instructions in slots 0, 1 and 2, respectively. The branch address of any branch instructions decoded by the decoder 320 is fed back to the address logic unit 312 via connection 325. The decoded instructions are then buffered in micro-instruction buffer 326 before being used to control the scalar register file 328 and the control register file 330 and their respective ALUs: 332, 334 and 336.

The output 350 from the systolic array, which is the sum of absolute differences, is passed to a register in the scalar register file 328, where it may be used as in input for further computation.

The motion estimation module is able to issue up to three operations per clock cycle. All the instructions have a latency of one, except for the Cmp instructions that set the conditional flags and have a latency of two. The machine can either work on the vector array or on the scalar part.

The Motion Estimator module communicates with the host processor or system through a system interface module 310, which can be tailored for the particular interconnect needed. The system interface module 310 can write data to and read data from the ME module through a memory-mapped mechanism. Typically, the system interface will write pixel data from the previous and the current frame to the ME module via connection 352, and will read out the resulting Motion Vectors, and other control data via link 348. The external connections to the system interface include an address line 342, a data bus 344 and a control signal line 346. In this embodiment, the Motion Estimator module is a stand-alone module that can perform the whole process of the motion vector computation and not only the expensive SoAD computation. The inclusion of a programmable pipeline makes the whole design similar to a general-purpose vector array, except that it is optimized for implementing motion estimation. The system interface may be integrated into the motion estimation module or separated from it.

The following sections describe the functionality of each one of the main components of the Motion Estimation module in more detail.

The Vector Array

The search window pixels are loaded on each cycle from a local SRAM in the memory subsystem, while the pixels from the current frame are piped down a row of PEs, or are also fetched from the SRAM and broadcast to the PEs. This allows multiple macroblock comparisons to occur at once. Depending on the algorithm, up to 16 PEs will be used at one time. The four PEs 0, 4, 8, and 12 are equipped with three extra adders to compute interpolated pixels. This computation is done at the same clock cycle with the implementation of the SoAD. A further embodiment, with higher clock frequency, might require the pipelining of these two computations.

The Memory Subsystem and the Virtual Memory Translation Unit (VMTU)

The memory subsystem is a central part of the Motion Estimation module. It includes sufficient SRAM memory to store a large number of pixels from the search window and the current MB in order to provide data to the PEs. Preferably, it operates in one clock cycle. Besides being a repository for pixel data, the memory is also used to store incoming and outgoing data, as well as scratchpad data used for motion estimation.

The functionality of the VMTU system provides two very important features to the ME module: first, it provides the capability of implicit padding of the frames in case the MB is at the edge of the frame. For example, if the MB is at the top row of the current frame, every memory access outside the frame is explicitly converted to an access at the corresponding pixel of the first row of the frame. This method enables fast and efficient generation of addresses in a way which is transparent to the programmer. This capability can be enabled or disabled using the control registers to accommodate cases where padding is performed.

Second, the VMTU offers an abstract view of the memory as a 2-D space that contains pixels. The programmer can traverse this space by providing only the (x,y) coordinates of the pixel(s) that need to be accessed. Typically, the memory system has to provide more than a single pixel to satisfy the bandwidth requirements of the 16 PEs. The address that is given as input to the VMTU is the address of the top left pixel of a set of pixels that are read from memory. The pattern of pixels that is read from memory is specified through two control registers. In this way, the memory does not need to read out all of the 16 pixels when only a subset of them are needed.

The memory system can be in either of two modes: a "pixel" mode and a "linear" mode. In the former mode, the DMA needs to provide only the address where the requested data reside, and the memory system is responsible for fetching them. Up to three such address pairs can be given to the memory system per clock cycle. This mode of operation is used during the SoAD computation, when the programmer has the concept of search windows and macroblocks to work with. Each port of the DMA is capable of providing up to 16 pixels to the PEs.

In the "linear" mode, the programmer views the memory as a large, linear space. This mode of operation is used for performance non-critical phases of the algorithm in which the memory space is not a 2-D space. The programmer can read or write single, double, and quadruple words in the "linear" memory using the appropriate instruction. Since the SRAMs in the ME are 6-bit wide, one single word is a 6-bit quantity, a double word is two 6-bit quantities, and a quadruple word is four 6-bit quantities.

SRAM Sizes

The SRAMs in the memory subsystem need to be able to provide up to sixteen pixels from the search window (SW)

and sixteen pixels from the current MB in any clock cycle. Therefore, the ME needs 16+16=32 single-ported SRAMs for the SW and the current MB. For the preferred embodiment, each of the search window SRAMS has 192 entries, and each of the current macroblock SRAMs has 16 entries. The boundary SRAMs have 24 entries each. The size of the SRAM of the ME is 3,424 entries, with each entry being 6 bits. The following tables show the number and the size of the SRAMs, as well as their organization:

| SRAM Name | Number of Entries | Width (bits) |
|---|---|---|
| Search Window A | 192 | 6 |
| Search Window B | 192 | 6 |
| Search Window C | 192 | 6 |
| Search Window D | 192 | 6 |
| Search Window E | 192 | 6 |
| Search Window F | 192 | 6 |
| Search Window G | 192 | 6 |
| Search Window H | 192 | 6 |
| Search Window I | 192 | 6 |
| Search Window J | 192 | 6 |
| Search Window K | 192 | 6 |
| Search Window L | 192 | 6 |
| Search Window M | 192 | 6 |
| Search Window N | 192 | 6 |
| Search Window O | 192 | 6 |
| Search Window P | 192 | 6 |
| Current MB A | 16 | 6 |
| Current MB B | 16 | 6 |
| Current MB C | 16 | 6 |
| Current MB D | 16 | 6 |
| Current MB E | 16 | 6 |
| Current MB F | 16 | 6 |
| Current MB G | 16 | 6 |
| Current MB H | 16 | 6 |
| Current MB I | 16 | 6 |
| Current MB J | 16 | 6 |
| Current MB K | 16 | 6 |
| Current MB L | 16 | 6 |
| Current MB M | 16 | 6 |
| Current MB N | 16 | 6 |
| Current MB O | 16 | 6 |
| Current MB P | 16 | 6 |
| Boundary SRAM X | 24 | 6 |
| Boundary SRAM Y | 24 | 6 |
| Boundary SRAM Z | 24 | 6 |
| Boundary SRAM W | 24 | 6 |

This memory allocation is shown pictorially in FIG. 6. In FIG. 6, 'SW' denotes memory for pixel values from the search window, 'currMB' denotes memory for pixel values from the current macroblock and 'bound' denotes memory for pixel values from the boundaries. It is emphasized that these SRAM sizes refer to the embodiment of a particular algorithm. Other algorithms, with larger search windows, might require additional memory.

Boundary SRAMs

The SRAMs that are used in the ME module are preferably single-ported, so as to minimize the physical size of the module. Dual-ported SRAMs of the same memory size are almost twice as large, but could be used. The constraint that a particular SRAM memory is unable to read two pixels from two different addresses in a single clock cycle presents a challenge for some particular cases. During the course of the SoAD computation, the memory is accessed from two different addresses: this is how data are inserted into the systolic array for parallel computation. When the current MB is at the edges of the frame, the VMTU will convert the incoming addresses to the corresponding addresses within the frame and will attempt to access the appropriate SRAMs. In that case, a series of memory accesses that normally would have been made to N different SRAMs are collapsed to accesses in a smaller number of SRAMs. This entails more accesses per SRAM from different addresses.

To solve this problem, the ME memory system is equipped with four SRAMs (called boundary SRAMs) that are used to provide this extra output port. They store the first or the last column of a frame depending on the position of the current MB in the frame. The storage of pixel data in the Boundary SRAMS is initiated from the system interface.

DMA Unit

The DMA unit is used to generate up to three independent addresses that are fed to the memory subsystem. These addresses can be either absolute or a pair of (x, y) coordinates in a 2-D space. In the former case, only the address for port 0 will be used, while the latter case is useful for the SoAD computation in a search window.

The DMA unit contains six 16-bit registers. These registers control the functionality of the address generation by the DMA and can be written by the programmer. They are mapped to control registers so that they can be read and modified in a single clock cycle. The registers are as follow:

(i) The initial address in register A stores the address from which the DMA starts counting. This can be either an absolute 16-bit address (from 0 to N−1, where N is the memory size), or a (x, y) coordinate pair.

(ii) The vector size in register N is the total size of the space that the DMA will cover. For example, N=256 in order to cover all the 16×16 pixels of a MB.

(iii) The chunk size in register K is the size of the subvector that the DMA will cover before the value of the skip is added to the current address register C. In the previous example, K=16.

(iv) The register S stores the stride that is added to C if the skip J is not applied. It can be either an absolute 16-bit 2's complement number or a pair of 2's complement numbers for the x and y directions. For the example, S=(8, 0) if a set of 16 pixels are read from the memory, and the scan of the memory is row-wise.

(v) The register J stores the skip that is added to C, when a chunk K has been scanned. For the example, J=(−16, 2), to jump to the next row.

(vi) The register C contains the address of the pixel to be accessed. It can be updated by the DMA, or be set by the programmer (for example, when only a single memory access is needed).

There are three such register sets, for a total of 18 registers. The contents of the registers remain intact across different loops, so that the overhead time is minimized in a lot of cases.

Crossbar Switch

The crossbar switch serves as a high speed interconnect network between the memory subsystem and the 16 PEs. Preferably, it can connect each one of the 16×3=48 pixels coming out of the 3 output ports of the memory subsystem to each one of the PEs. However, some connections are not often used, so cost and complexity can be reduced by reducing the number of connections.

The crossbar control logic is used to control the functionality of the crossbar switch using bitmasks. These bitmasks are stored in the control registers and are updated once per clock cycle.

Microcontroller

The Motion Estimator module is controlled by a microsequencer that includes the program counter 316, the address logic 318, the decoders 320,322 and 324 and the buffer 326 shown in FIG. 5. The micro-sequencer can issue three instructions in a single clock cycle. This achieves the parallelism which is inherent in the ME computation. The first stage of the three-stage pipeline is the logic that generates the address of the next VLIW word to be accessed. The second stage is the decoding phase of the three issued instructions. The output of the second stage is stored in the micro-instruction buffer and contains all the control signals to the scalar data path. All the control signals to the crossbar switch are generated through the crossbar control logic. Further description of the Instruction Set Architecture (ISA) is given below.

System Integration

The Motion Estimator connects to the rest of the system through a system Interface (310 in FIG. 5). The system communicates control and data to the ME unit via a well-defined protocol, or application programmer interface (API). A memory mapped scheme is used to translate the function calls from the system to physical addresses and control signals to derive the physical addresses and the control signals required to read or write data to the various storage elements within the ME. These storage elements are the memory 302, the register files 328 and 330, the micro-instruction SRAM 318, and the processing elements. Some of the connections are omitted from FIG. 5 for the sake of clarity. The system interface also has temporary storage buffers to accommodate potential bus width mismatches between the external buses and the internal memory. The system interface may be separate for the ME core or integrated with it.

Motion Estimator Instruction Set Architecture

The instruction set architecture (ISA) of the ME unit is composed of 32-bit long instructions. These are described in more detail below.

Format of the Instruction Set

Figure 7:
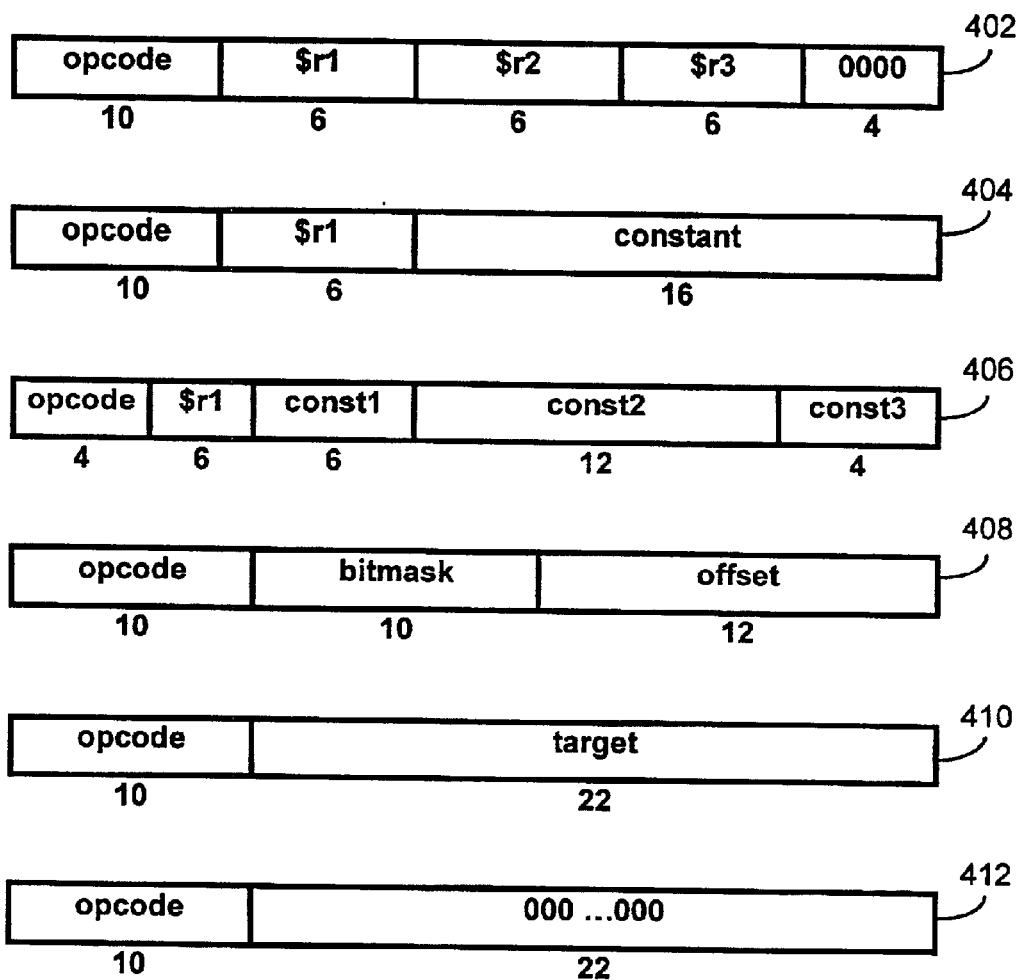
FIG. 7 shows a series of instruction formats according to an embodiment of the Instruction Set Architecture of the invention.

The instructions of the ME ISA are encoded according to one of the six formats shown in FIG. 7 as 402, 404, 406, 408, 410 and 412. Each format comprises a 10-bit opcode followed by 22 bits of additional information. '$r1', '$r2' and '$r3' denote 6-bit register addresses. 'const1', 'const2' and 'const3' denote constant values. The numbers under each section of the format denote the number of bits in the section. For example, the format 402 consists of an opcode followed by three 6-bit register addresses followed by four zeros.

Bitmasks and Addresses

The operation of the crossbar switch is controlled through a set of bitmasks that are generated by the programmer via the crossbar control logic. This paragraph explains the functionality of the crossbar control logic and the bitmasks for the preferred implementation of the crossbar switch. This implementation is general enough to be used in wide variety of algorithms, but is not as general as a full crossbar switch. The bitmasks are used to enable/disable individual PEs, and to direct data read from the memory ports to them.

In pixel mode, three pairs of addresses are provided to the memory, and are translated to real addresses via the Virtual Memory Translation Unit (VMTU). In linear mode, the programmer needs to provide the actual addresses of the SRAMs.

Bitmasks.

As explained previously, the operation of the vector array is controlled through the use of bitmasks that are generated by the programmer either manually or with the help of the UpdateBitmask instructions. All of these bitmasks are assigned to specific registers in the control register (CR) file to save read ports. The following table shows the bitmasks, in which register they are stored, the mode of operation that are needed for, and their functionality.

| Num | Register | Mode of operation | Functionality |
|---|---|---|---|
| 0 | $CR_r0 | Only used for pixel mode. | It contains various control information, such as the position of the MB in the frame, whether the ME module can search for MV outside the frame, etc. The $CR_r0 is fed to the VMTU to help with the address generation. The following text provides more details for this register. |
| 1 | $CR_r1 | Every mode (pixel and linear) | It contains a nine-bit mask which is fed to the memory subsystem. It encodes the memory mode for each MV pair. Usually, it is placed there manually by the programmer. The following text provides more details for this register. |
| 2 | $CR_r2 | Every mode (pixel and linear) | It contains a nine-bit mask which is fed to the memory subsystems. It encodes the usage of each MV pair for each memory system. Usually, the programmer places it there manually. The following text provides more details for this register. |
| 3 | $CR_r3 | Only used for pixel mode | It contains the cycle counter. It is used as an iteration variable when an SoAD computation takes place, and is updated automatically. |
| 4 | $CR_r4 ($HW_r0) | Every mode | In pixel mode, it contains a bitmask that enables or disables the functionality of each one of the PEs. Look at the vector instructions for more information. In linear mode, it is used to encode the destination for a Mov instruction |
| 5 | $CR_r5 ($HW_r1) | Every mode | In linear mode, it is used to encode the source for a Mov instruction. Look at the vector instructions for more information. |
| 6 | $CR_r6 ($HW_r2) | Every mode | Look at the vector instructions for more information. |
| 7 | $CR_r7 ($HW_r3) | Every mode | Look at the vector instructions for more information. |
| 6 | $CR_r8–13 | Every mode | The six registers of the DMA unit 1 |
| 7 | $CR_r14–19 | Every mode | The six registers of the DMA unit 2 |
| 8 | $CR_r20–25 | Every mode | The six registers of the DMA unit 3 |

Some of the bitmasks are described in more detail below.

(a) The $CR_r0 register contains the nine-bit mask:

bit-0: right
bit-1: left
bit-2: bottom
bit-3: top
bit-4: advanced right
bit-5: zero location
bit-6: 0 for Cougar-based, 1 for TSME
bit-7: Extended search, 0 for SC within window only, 1 for extended SC
bit-8: Forced Intra Flag This encoding is particular to the preferred embodiment, and is not intended as a general implementation. In the preferred embodiment, the system bus transfers this information to $CR_r0 at the beginning of the processing of a single MB. The five last bits are used as input to the VMTU and they convey information about the relative position of the MB with respect to the frame.

(b) The CR_r1 register contains the 15-bit mask:

| Mode of SRAM of MV1 | Mode of SRAM of MV2 | Mode of SRAM of MV3 |
|---|---|---|
| $CR_r1[14:10] | $CR_r1[9:5] | $CR_r1[4:0] |

This mask is used by the VMTU to read/write the appropriate number of pixels in the SRAMs.

FIG. 8 shows the numbering scheme used for pixels. The following table describes the memory mode encoding:

| Memory Mode | Encoding |
|---|---|
| Linear mode | 00000 |
| Pixel mode, all sixteen pixels | 10000 |
| Pixel mode, pixels 1, 2, 3, 4, 5, 6, 7, 8, 9, 11 | 10001 |
| Pixel mode, pixels 1, 2, 3, 4, 5, 6, 7, 8 | 10010 |
| Pixel mode, pixels 1, 2, 3, 4 | 10011 |
| Pixel mode, pixels 1, 3 | 10100 |
| Pixel mode, pixels 2, 4 | 10101 |
| Pixel mode, pixels 1, 4 | 10110 |
| Pixel mode, pixels 2, 3 | 10111 |
| Pixel mode, pixels 1, 2, 5, 6 | 11000 |
| Pixel mode, pixels 3, 4, 7, 8 | 11001 |

For example, the bitmask is set to 10010 to cause all of the pixels of the first and second square to be read. Given only the address of the first pixel in the 2-D space, the memory subsystem can return up to 16 pixels. Depending on the value of the five-bit mask, the programmer can define a subset of these pixels to be read/written from/to the memory to avoid unnecessary operations and reduce power consumption.

(c) The $CR_r2 register contains a nine-bit mask:

| MV1 usage | MV2 usage | MV3 usage |
|---|---|---|
| $CR_r2[8:6] | $CR_r2[5:3] | $CR_r2[2:0] |

The following table describes the MV usage encoding:

| MV usage | Encoding |
|---|---|
| MV is not used | 000 |
| Used in SW SRAM | 100 |
| Used in CurrMB SRAM | 101 |
| Reserved | 110 |
| Reserved | 111 |

(d) The cycle counter in $CR_r3 is the only register which can set the Z_cnt flag.

(e) The $CR_r4–7 ($HWr0–3) registers are used in conjunction with the vector instructions. They contain bitmasks that are used to control the crossbar switch and the PEs during SoAD computation.

Computational Instructions

The following instructions perform the vector operations in the systolic array of the ME unit, as well as scalar operations used mostly for control. Additionally, these instructions are completed in one clock cycle and coordinate all 16 PEs in that amount of time. All the vector instructions begin with the prefix vec_. The number in parenthesis shows the format of each instruction, with reference to FIG. 7.

vec_Soad (412)

This operation performs the SoAD computation using a number of PEs in the systolic array. It is able to enable/disable individual processing elements selectively, and to direct the output of different SRAMs to particular PEs. The inputs to this operation are the three bitmasks in the four control registers: $HW_r0, $HW_r1, $HW_r2, and $HW_r3. These registers contain bitmasks as follows:

(a) The HW register $r0 is used to store a 16-bit bitmask in which a "0" in location "i" of the register means that PEi is disabled for the computation of the SoAD, while a value of "1" means that it is enabled. For example, the bitmask b1100000011000000 means that only PE0, PE1, PE8, and PE9 are used to compute the SoAD in a specific clock cycle. The capability to selectively enable or disable an individual PE can be used either because its functionality is not needed, or to implement data-gating at the algorithmic level.

(b) The registers $HW_r1 and $HW_r2 are used to associate the data that are read from the MV1 and MV2 to the PEs. The DMA generates three pairs of motion vectors when the memory is in the pixel mode. In the case of vec_SoAD, the first two pairs refer to the SW SRAM, and the last pair refers to the CurrMB SRAM.

(c) The 16 PEs are partitioned in four groups (PE0–3, PE4–7, PE8–11, PE12–15), and all the PEs within a group can only access data that are TL, TR, BL, BR in the corresponding square. The $HW_r1 consists of two parts: the first part (MS half) refers to the four groups of the PEs, and shows which one of the four pixels in a square will be directed to the PEs of that group. The second part (LS half) refers to individual PEs within the group and shows which square among the four will send data to the PEs.

| PE 0–3 | PE 4–7 | PE 8–11 | PE 12–15 | PE 0, 4, 8, 12 | PE 1, 5, 9, 13 | PE 2, 6, 10, 14 | PE 3, 7, 11, 15 |
|---|---|---|---|---|---|---|---|
| 15...14 | 13...12 | 11...10 | 9...8 | 7...6 | 5...4 | 3...2 | 1...0 |

The following two tables describe the encoding of this information for $HW_r1.

TABLE 1

Encoding of the first half of $HW_r1

| Pixel used | Encoding |
| --- | --- |
| Top Left | 00 |
| Top Right | 01 |
| Bottom Left | 10 |
| Bottom Right | 11 |

TABLE 2

Encoding of the second half of $HW_r1

| Square used | Encoding |
| --- | --- |
| First square (pixels 1, 2, 3, 4) | 00 |
| Second square (pixels 5, 6, 7, 8) | 01 |
| Third square (pixels 9, 10, 11, 12) | 10 |
| Fourth square (pixels 13, 14, 15, 16) | 11 |

(d) The register $HW_r2 is used to associate a wave of addresses to a PE. In most algorithms, the search window is accessed from two different addresses per clock cycle (the MV1 and the MV2). This bitmask is used to distinguish between the two addresses. It is 16-bits long, since 16 PEs need one bit to distinguish between two addresses.

(e) The register $HW_r3 is used to encode the destination of the data read by the MV3 address. It has identical format to the $HW_r1, but the source of the data is the MV3 address, not the MV1/MV2. If the LS half of the $HW_r3 is all zero, then the PEs get their MV3 data from the PEs on their right.

vec_SoadHP (412)

The operation is similar to the vec_Soad operations, but, in this case, the PEs perform bilinear interpolation of two or four inputs before the actual SoAD operation. This used in half pixel search. Only four PEs are used for half pixel search (PE0, 4, 8, 12). The inputs of this operation are the three first hardwired registers.

The registers $HW_r0, $HW_r1, and $HW_r2 contain bitmasks as follows:

(a) The register $HW_r0 contains a 16-bit mask that shows which PEs are enabled for the accumulation computation.

(b) The second bitmask $W_r1, is used to direct the appropriate data read from the memory to the PEs. The bitmask is sixteen-bit long and is partitioned into four parts: one for each one of the four PEs that can take part in the HP motion estimation. The data that are read from MV1 are used to feed the four PEs.

| First MV pair PE0 | First MV pair PE4 | First MV pair PE8 | First MV pair PE12 |
| --- | --- | --- | --- |
| 15 . . . 12 | 11 . . . 8 | 7 . . . 4 | 3 . . . 0 |

For each one of the four-bit partitions, the following table shows all the possible values and their meaning.

| Bitmask encoding | Value selected |
| --- | --- |
| 0000 | All the four pixels, 1, 2, 3, 4 |
| 0001 | All the four pixels, 2, 5, 4, 7 |
| 0010 | All the four pixels, 5, 6, 7, 8 |
| 0011 | All the four pixels, 6, 9, 8 ,11 |
| 0100 | All the four pixels, 4, 7, 10, 13 |
| 0101 | All the four pixels, 7, 8, 13, 14 |
| 0110 | Two Vertical pixels, 1, 3 |
| 0111 | Two Vertical pixels, 2, 4 |
| 1000 | Two Vertical pixels, 5, 7 |
| 1001 | Two Vertical pixels, 6, 8 |
| 1010 | Two Horizontal pixels, 1, 2 |
| 1011 | Two Horizontal pixels, 3, 4 |
| 1100 | Two Horizontal pixels, 2, 5 |
| 1101 | Two Horizontal pixels, 4, 7 |
| 1110 | Two Horizontal pixels, 5, 6 |
| 1111 | Two Horizontal pixels, 6, 9 |

The third bitmask in $HW_r2 is used to encode the destination of data read by the MV3 address. It has the following format:

| Third MV pair PE0 | Third MV pair PE4 | Third MV pair PE8 | Third MV pair PE12 |
| --- | --- | --- | --- |
| 15 . . . 12 | 11 . . . 8 | 7 . . . 4 | 3 . . . 0 |

For each one of the four-bit partitions, the following table shows all the possible values and their meaning.

| Bitmask encoding | Value selected |
| --- | --- |
| 0000 | Pixel 1 |
| 0001 | Pixel 2 |
| 0010 | Pixel 3 |
| 0011 | Pixel 4 |
| 0100 | Pixel 5 |
| 0101 | Pixel 6 |
| 0110 | Pixel 7 |
| 0111 | Pixel 8 |
| 1000 | Pixel 9 |
| 1001 | Pixel 10 |
| 1010 | Pixel 11 |
| 1011 | Pixel 12 |
| 1100 | Pixel 13 |
| 1101 | Pixel 14 |
| 1110 | Pixel 15 |
| 1111 | Pixel 16 | vec_Acc (412)

This operation is similar to the vec_Soad operations, but, in this case, the PEs perform additions, and not SoAD operations. This operation is useful in projection computation, or in the computation of the average intensity of a MB. Usually, two or four PEs are used to perform this kind of computation.

(a) The registers $HW_r0, $HW_r1, and $HW_r2 contain bitmasks with the following information:

(b) The register $HW_r0 contains a 16-bit mask that shows which PEs are enabled for the accumulation computation.

The registers $HW_r1 and $HW_r2 have a similar meaning to the register $HW_r1 and $HW_r2 for the vec_Soad instruction. The $HW_r1 is identical to $HW_r1 for vec_Soad, and the $HW_r2 is identical to $HW_r2 where we differentiate between MV1 and MV3.

MinS.L $SC_r1 (402)

```
if ($SC_r1 < $r1)   {
    $r1 = $SC_r1;
    $r2 = $r3;
}
```

This operation examines whether $SC_r2<$r1, and, if true, it replaces the values of $r1 and $r2 by $SC_r2 and $r3 respectively. This instruction can be issued from slots 0 and 1 simultaneously.

| The register | Is hardwired to the register if the operation is issued in slot 0 | Is hardwired to the register if the operation is issued in slot 1 |
| --- | --- | --- |
| $r1 | $SC_r25 | $SC_r29 |
| $r2 | $SC_r26 | $SC_r30 |
| $r3 | $SC_r27 | $SC_r31 |

MinD.L $SC_r1, $SC_r2 (402)

```
if ($SC_r1 < $rl)   {
    $r1 = $SC_r1;
    $r2 = $r3;
}
if ($SC_r2 < $r4)   {
    $r4 = $SC_r2;
    $r5 = $r3;
}
```

This operation examines whether $SC_r1<$r1, and, if true, it replaces the values of $r1 and $r2 by $SC_r1 and $r3, respectively. Independently, it examines whether $SC_r2<$r4, and, if true, it replaces the values of $r4 and $r5 by $SC_r2 and $r3, respectively. This instruction can be issued from slots 0 and 1 simultaneously.

| The register | Is hardwired to the register if the operation is issued in slot 0 | Is hardwired to the register if the operation is issued in slot 1 |
| --- | --- | --- |
| $r1 | $SC_r24 | $SC_r28 |
| $r2 | $SC_r25 | $SC_r29 |
| $r3 | $SC_r23 | $SC_r23 |
| $r4 | $SC_r26 | $SC_r30 |
| $r5 | $SC_r27 | $SC_r31 |

CmpC $r1, Constant (404)

This operation performs a comparison between the register $r1 and a constant value, sets the flags Z_CR and N_CR to 1 depending on the comparison. If $r1<constant, then N_CR is set to true. The position of the instruction determines which flag is set. The register $r1 can be in CR or SC register file. The Cmp instructions are the only ones that can set the conditional flags. Note that the CmpC instruction updates the conditional flags in the next clock cycle, and, therefore, every BrMask instruction that depends on the CmpC has to be at least two clock cycles away from the CmpC instruction.

Cmp $r1, $r2 (402)

This operation performs a comparison between the registers $r1 and $r2, and they set the flag pair Z_CR and N_CR to 1 depending on the value of the comparison. The position of the instruction determines which flag is set. The register $r1 can be in CR, or SC register file depending on the issue slot. The Cmp instructions are the only ones that can set the conditional flags. Note that the Cmp instruction updates the conditional flags in the next clock cycle, and, therefore, every BrMask instruction that depends on the CmpC has to be at least two clock cycles away from the Cmp instruction.

Shift.WLU $r1, N (404)
Shift.WRU $r1, N (404)
Shift.WRS $r1, N (404)

$r1=$r1>>N $r1=$r1<<N

In these operations, N should only be 1, 2, 4, or 8. The shift is applied to the 16-bit value of the register $r1(.W option). The shift right command comes into flavors: unsigned, and signed.

SignExt $r1,N (404)

$r1[N-1 . . . 0]=$r1[N-1 . . . 0]

$r1[15 . . . N]=sign($r1[N-1 . . . 0])

In these operation, N should only be 1, 2, 4, or 8. The operation sign extends a value at the N LS bits of the register.

Add.W $r1, $r2, $r3 (402)
Sub.W $r1, $r2, $r3 (402)

$r1=$r2+/−$r3

The registers $r1, $r2 and $r3 can be in CR, or SC register file. The postfix .W indicates that a 16-bit long addition/subtraction is performed. The addition is always 2's complement.

AddC.W $r1, Constant (404)
SubC.W $r1, Constant (404)

r1=$r1+/−constant

The register $r1 can be in CR, or SC register file depending on the issue slot. The postfix .W indicates that a 16-bit long addition/subtraction is performed.

Add.B $r1, $r2 (402)
Sub.B $r1, $r2 (402)

$r1[7:0]=$r2[7:0]+/−$r3[7:0]

$r1[15:8]=$r2[15:8]+/−$r3[15:8]

The registers $r1, and $r2 can be in CR, or SC register file depending on the issue slot. The postfix .B indicates that two 8-bit long additions/subtractions are performed. This operation is exploiting the sub-word parallelism in the ME algorithm.

AddC.B $r1, constant (404)
SubC.B $r1, constant (404)

$r1[7:0]=$r1[7:0]+/−constant[7:0]

$r1[15:8]=$r1[15:8]+/−constant[15:8]

The register $r1 can be in CR, or SC register file depending on the issue slot. The postfix .B indicates that two 8-bit long additions/subtractions are performed. This operation is exploiting the sub-word parallelism in the ME algorithm.

Inc.W $r1 (406)
Dec.W $r1 (406)

These operations increment or decrement the register $r1 by one. The register $r1 can be in CR, or SC register file depending on the issue slot.

AbsC.W $r1 (402)

This operation finds the absolute value of the content of $r1. The register $r1 can be in CR, or SC register file depending on the issue slot.

Absl.B $r1 (402)

$r1[15:8]=abs($r1[15:8])

$r1[7:0]=abs($r1[7:0])

The register $r1 can be in CR, or SC register file depending on the issue slot.

And.W/Or.W $r1, $r2, $r3 (402)

AndC.W/OrC.W $r1, bitmask (404)

These operations perform bit-wise and/or operations on the value of register $r1 using either the bitmask in register $r2 or the constant "bitmask". The registers $r1, and $r2 can be in CR, or SC register file depending on the issue slot.

Min.W/Max.W $r1, $r2 (402)
MinC.W/MaxC.W $r1, const (404)

The register $r1 receives the minimum or maximum between $r1 and $r2 (for Min/Max) or between $r1 and a constant value (for MinC and MaxC).

CondAddC.W $r1, const1, const2, const3 (406)

```
if ($r1 == const1)
    $r1 += const2;
else
    $r1 += const3;
```

The register $r1 can be in the SC or the CR register file. The const1 constant is an unsigned 6-bit value, and the const2 value is a 2's complement signed value. The const3 value is a 2's complement signed value with a small exception: the constant "1000" is interpreted as +8 instead of as −8. Thus, the range of the const3 value is [−7, +8].

CondAddC.BH $r1, const1, const2, const3 (406)

```
if ($r1[15:8] == const1) {
    $r1[15:8] += const2[11:6];
    $r1[7:0] += const2[5:0];
}
else
    $r1[15:8] += const3;
```

The register $r1 can be in the SC or the CR register file. The const1 constant is an unsigned 6-bit number. The const1 constant is an unsigned 6-bit value, and the const2 value is a 2's complement signed value. The const3 value is a 2's complement signed value with a small exception: the constant "1000" is interpreted as +8 instead of as −8. Thus, the range of the const3 value is [−7, +8].

CondAddC.BL $r1, const1, const2, const3 (406)

```
if ($r1[7:0] == const1) {
    $r1 [15:8] += const2[11:6];
    $r1 [7:0] += const2[5:0];
}
else
    $r1[7:0] += const3;
```

The register $r1 can be in the SC or the CR register file. The const1 constant is an unsigned 6-bit number. The const1 constant is an unsigned 6-bit value, and the const2 value is a 2's complement signed value. The const3 value is a 2's complement signed value with a small exception: the constant "1000" is interpreted as +8 instead of as −8. Thus, the range of the const3 value is [−7, +8].

Data Transfer Instructions

This category contains a series of instructions that are used to move data from one storage area to the other and load/store individual registers.

Mov (412)

This operation is used to move data from one storage area to another. The following areas are covered with this instruction: all the register files, the PEs, and the memory. Although this instruction permits the exchange of data among all the storage areas, some of the cases are not supported by the hardware and should be avoided. The Mov instruction assumes that its operands are the registers $HW_r0, and $HW_r1. The operands of the operation are as follows:

(a) Register $r0 of the HW RF contains the destination of the transfer. It contains two bitmasks. The first bitmask is a three bits long and is used to select the area to which data are transferred. It occupies the three MS bits of the $HW_r0. The encoding is shown in the following table:

| Storage type | Encoding |
|---|---|
| SRAM | 000 |
| Reserved | 001 |
| Reserved | 010 |
| Reserved | 011 |
| Reserved | 100 |
| Register file | 101 |
| Processing Element | 110 |
| Reserved | 111 |

(b) The second bitmask of $HW_r0 is used to encode the actual destination. It occupies the least significant bits of the register. The following cases apply:

(c) If the destination is the SRAM (i.e., $HW_r0[15:13]=000), the selected address MV will provide the data.

(d) If the destination is a register in a register file (i.e. $HW_r0[15:13]=101), the slice $HW_r[5:0] contains a six bit bitmask that shows the source register. The bitmask is as follows: 1xxxxx denotes an SC register ($SC_r0 to $SC_r31), and 0xxxxx denotes a CR register ($CR_r0 to $CR_r15).

The slice $HW_r[7 . . . 6] contains a two bit mask that describes which portions of the 16-bit register will be used as destination. The following table describes all the different cases:

| Case | Code |
|---|---|
| In this case, the 6 LS bits of the register are a destination, and the rest 10 bits should be set to zero. | 00 |
| Use the 12 LS bits of the selected register as destination. The rest 4 bits should be set to zero. | 01 |
| Use all 16 bits of the register as the destination. | 10 |
| Use all 16 bits, but in two different parts of 8 bits each. | 11 |

(e) If the destination is a PE (i.e. $HW_r0[15:13]=110), the slice $HW_r0[3:0] contains a four-bit mask that shows which one of the PEs are used as a source.

The register $HW_r1 contains the same information for the source of the transfer. In that case, the following encoding for the $HW_r1[7:6] applies:

| Case | Code |
|---|---|
| Use the six (6) LS bits of the selected register as | 00 |

-continued

| Case | Code |
|---|---|
| source. | |
| Use the twelve (12) LS bits of the selected register as source | 01 |
| Use the all the 16 bits of the register as source. | 10 |
| Use all the 16 bits, but in two different parts of 8 bits each. | 11 |

ReadM.W/WriteM.W (412)
ReadM.D/WriteM.D
ReadM.Q/WriteM.Q

Operations that are used to trigger an operation of the memory system in the linear mode. These operations assume that the address (for the ReadM), and the address and data (for the WriteM) have are valid at the address and data buses.

The first two instructions read/write a single six-bit quantity from/to the memory, the ReadM.D/WriteM.D read/write two six-bit quantities from/to the memory, and the last set of instructions read/write four six-bit quantities from/to the memory.

Normally, these instructions are coupled with a Mov instruction to transfer data from/to memory to/from register file. The Read/Write instruction is used to trigger the read/write operation and determine the data type to be transferred, and the Mov instruction is used to control the crossbar switch.

MovR $r1, $r2 (402)

This operation moves the value of $r2 to $r1. The two registers should belong to the same register file. The registers $r1 and $r2 can be in CR, or SC register file.

MovPEtoRF.PE0_4 (412)

$SC_r10=(PE0); $SC_r11=(PE4);

This operation moves the contents of PE0 and PE1 to the SC register file. They are transferred in one clock cycle to $SC_r10 and $SC_r11.

MovPEtoRF.PE8_C (412)

$SC_r10=(PE8); $SC_r11=(PE12);

This operation moves the contents of PE8 and PE12 to the SC register file. They are transferred in one clock cycle to $SC_r10 and $SC_r11.

MovPEtoRF.PE1_5 (412)

$SC_r10=(PE1); $SC_r11=(PE5);

This operation moves the contents of PE1 and PE5 to the SC register file. They are transferred in one clock cycle to $SC_r10 and $SC_r11.

MovPEtoRF.PE9_D (412)

$SC_r10=(PE9); $SC_r11=(PE13);

This operation moves the contents of PE9 and PE13 to the SC register file. They are transferred in one clock cycle to $SC_r10 and $SC_r11.

MovPEtoRF.PE2_6 (412)

$SC_r10=(PE2); $SC_r11=(PE6);

This operation moves the contents of PE2 and PE6 to the SC register file. They are transferred in one clock cycle to $SC_r10 and $SC_r11.

MovPEtoRF.PEA_E (412)

$SC_r10=(PE10); $SC_r11=(PE14);

This operation moves the contents of PE10 and PE14 to the SC register file. They are transferred in one clock cycle to $SC_r10 and $SC_r11.

MovPEtoRF.PE3_7 (412)

$SC_r10=(PE3); $SC_r11=(PE7);

This operation moves the contents of PE3 and PE7 to the SC register file. They are transferred in one clock cycle to $SC_r10 and $SC_r11.

MovPEtoRF.PEB_F (412)

$SC_r10=(PE11); $SC_r11=(PE15);

This operation moves the contents of PE11 and PE15 to the SC register file. They are transferred in one clock cycle to $SC_r10 and $SC_r11.

LoadC $r1, Constant (404)

This operation loads a constant to a register $r1. The register $r1 can be in CR, or SC register file depending on the issue slot.

Branch Instructions

The branch instructions are used to change the flow of the program and jump to a target location if a condition is met. The target address is always the last field of the instruction.

BrMask Offset, Bitmask (408)

This instruction causes the flow of control to jump to "target" depending on the combination of the three condition flags of the data path. The bitmask is a ten-bit value that allows the user to branch on a number of different combinations of asserted and non-asserted condition bits.

| | |
|---|---|
| bit-0: | EnN_SC |
| bit-1: | N_SC |
| bit-2: | EnZ_SC |
| bit-3: | Z_SC |
| bit-4: | EnZ_cnt |
| bit-5: | Z_cnt |
| bit-6: | EnN_CR |
| bit-7: | N_CR |
| bit-8: | EnZ_CR |
| bit-9: | Z_CR |

This allows for a variation of branching conditions depending on the outcome of the previous DecCmp, and Cmp instructions, or the count down.

Jump Target (410)

Unconditional jump to target

Call Target (410)

This instruction calls a routine that ends with a return instruction. No passing of parameters is performed, and no nesting of call instructions is allowed at this point. The next PC is saved in a register and is loaded in the PC when the return instruction is executed.

Return (412)

This instruction returns from a function and restores the value of the PC. It has no operands.

Special Instructions

ResetPE (412)

This instruction resets the PEs. This is a synchronous reset.

Halt (412)

This instruction freezes the micro-sequencer to its current state, and is the last instruction executed. No other instruction can issue at the same time.

Nop (412)

Null operation, used to fill in empty VLIW instructions.

Instruction Set Scheduling Restrictions

The ME VLIW micro-sequencer issues up to three instructions per clock cycle. The following lists which instructions can be issued from every port of the VLIW machine.

(a) The Cmp, and CmpC instructions set the flags Z_CR, N_CR, Z_SC, and N_SC, and they are the only operations that can set these conditional flags. The BrMask instruction is used to activate the update of the cycle counter in $CR_r6 only when the EnZ_cnt bit is on. This counter is the only place that can set the Z_cnt flag.

(b) The double input ALU operations are: all the Add/CondAdd/Sub/And/Or/Shift/Min/Max/Cmp/CmpC operations plus the operations of the single input ALUs. The first operand is used when the dual input ALUs are doing the job of a single input ALU. The single input ALU instructions are:

(c) AddC/SubC/AndC/Inc/Dec/CondAdd/Shift/Abs/SignExt/MinC/MaxC (d) The MinSL/MinDL instructions are used to make the SoAD comparisons in the SC register file. The input registers are used to store the SoAD to be compared with the temporary minimum SoAD.

(e) The operations that change the control flow can only be issued from the last slot.

(f) All instructions except Cmp/CmpC have a latency of one clock cycle, i.e. the result can be used at the next clock cycle. The conditional flags that are set by the Cmp/CmpC are valid in the second cycle after the Cmp/CmpC.

(g) There are separate ports in the register file to transfer data between storage areas, i.e. between memory and registers. These ports are dedicated to this operation only, which is done using the Mov instruction.

(h) The destination register on all the instructions that write to the same register file must be unique. The source registers do not need to be unique.

(i) Nested call instructions are not supported.

(l) The Nop instruction can be issued in every slot.

(k) The transfer of data between the memory and the register files usually requires the combination of two instructions. In the following discussion, (M) denotes memory and (R) a register file:

(R)→(R): use the MovR instruction only.
(R)→(M):

| Slot-0 | Slot-1 |
|---|---|
| Mov (or in slot-1) | WriteM (to trigger the memory write) |

(M)→(R):

| Slot-0 | Slot-2 |
|---|---|
| Mov (or in slot-1) | ReadM (to trigger the memory read) |

Figure 9:
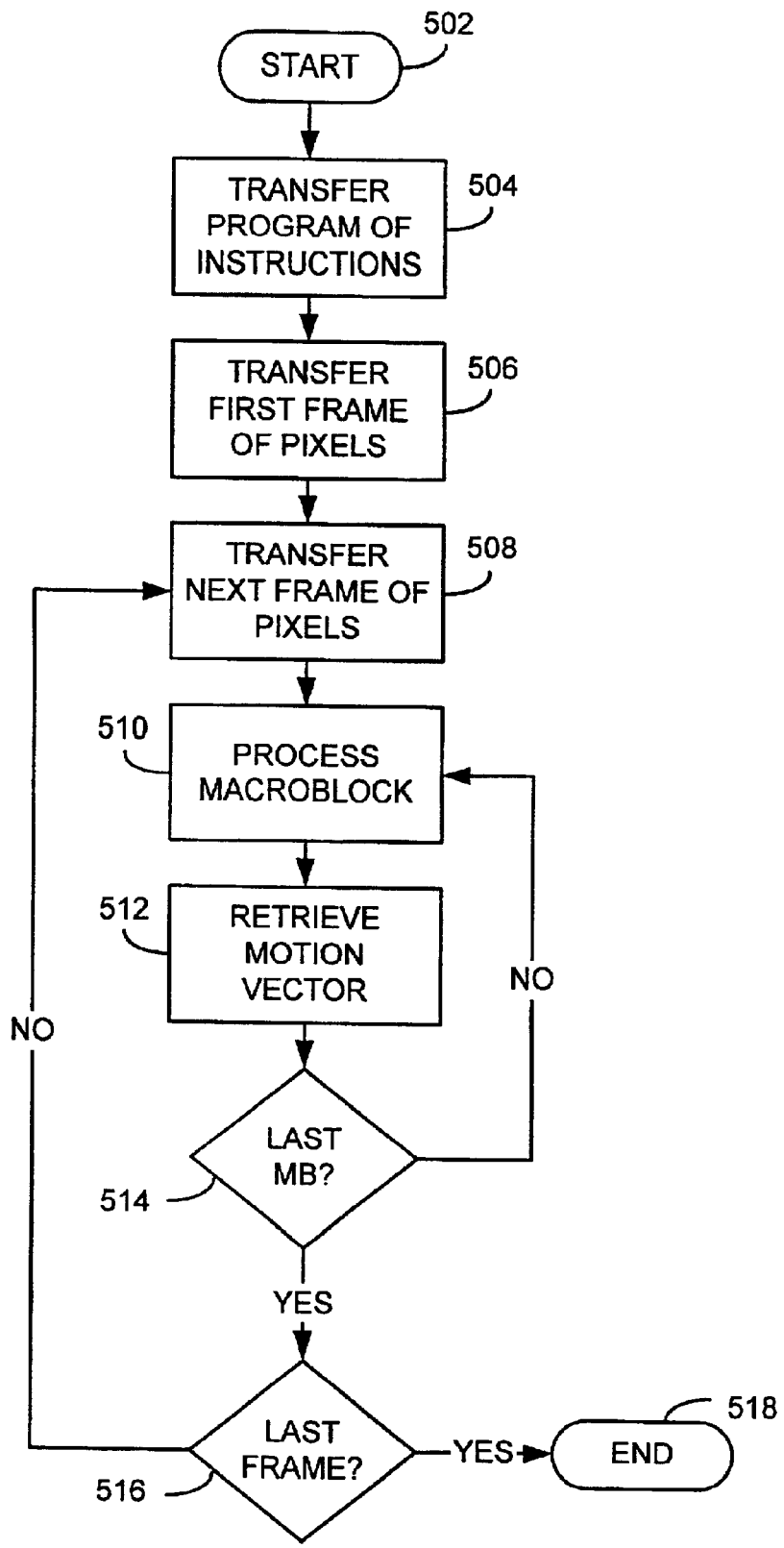
FIG. 9 is a flow chart of the one embodiment of the method of the invention.

A flow chart depicting the preferred embodiment of the method of the invention is shown in FIG. 9. The method relates to the use of a programmable motion estimation module to calculate motion vectors for digital video compression. The programmable motion estimation module is connected to a host video-processing module via a system interface. The method begins at start block 502. At block 504, a program of instructions is transferred from the host-video processing system to the programmable motion estimation module, where it is stored in an instruction memory. At block 506 the first frame of pixel values are transferred from the host-video processing system to the programmable motion estimation module, where they are stored in a data memory. This first frame is intra-coded by the video processing system, so no motion vectors are required. The next frame of pixel values is transferred to the data memory of the programmable motion estimation module at block 508. This becomes the current frame. At block 510 the first macroblock of the current frame is processed and the resulting motion vector is stored in registers within the motion estimation module. The macroblock is processed in accordance with the program of instructions stored in the instruction memory of the motion estimation module. At block 512 the host video processing system retrieves the motion vector. At decision block 514, a check is made to determine if this is the last macroblock of pixels in the current frame. If not, as depicted by the negative branch from decision block 514, flow returns to block 512 and the next macroblock is processed. If the macroblock is the last in the current frame, as depicted by the positive branch from decision block 514, flow continues to decision block 516, where a check is made to determine if this is the last frame in the sequence. If not, as depicted by the negative branch from decision block 516, flow returns to block 508 and the next frame of pixel values is transferred from the host video processing system to the data memory in the motion estimation module. If the current frame is the last frame, as depicted by the positive branch from decision block 516, the process is ended at block 518.

Those of ordinary skill in the art will recognize that the present invention has been described in terms of exemplary embodiments. However, the invention should not be so limited, since the present invention could be implemented using a variety of component which are equivalents to the invention as described and claimed.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A programmable motion estimation module for processing pixel values from a sequence of digital images, said programmable motion estimation module comprising:

a programmable microcontroller;

a scalar register file coupled to said programmable microcontroller, said scalar register file comprising a plurality of scalar registers;

a control register file coupled to said programmable microcontroller, said control register file comprising a plurality of control registers;

a crossbar logic unit coupled to the control register file and responsive to one or more control registers of the plurality of control registers;

a direct memory access unit coupled to the control register file and responsive to one or more control registers of the plurality of control registers;

a memory subsystem, responsive to the direct memory access unit, for storing pixel values, said memory subsystem having an image data input for receiving pixel values;

a plurality of processing elements each with plurality of inputs and at least one output coupled to the scalar register file; and a crossbar switch operable to distribute pixel values stored in the memory subsystem to at least one input of the plurality of inputs of the processing elements, said crossbar switch responsive to the crossbar logic unit.

2. A programmable motion estimation module as in claim 1 wherein a processing element of the plurality of processing elements comprises:
   a first input of the plurality of processing element inputs for receiving a first pixel value;
   a second input of the plurality of processing element inputs for receiving a second pixel value;
   a means for calculating the absolute value of the difference between the first pixel value and the second pixel value; and
   an accumulator comprising a register for storing an accumulated value and an adder for adding the accumulated value to the absolute value of the difference between the first pixel value and the second pixel value to obtain a new accumulated value, said accumulator being coupled to an output of the at least one outputs of the processing element.

3. A programmable motion estimation module as in claim 2, wherein the first and second inputs of the processing element of the plurality of processing element inputs are coupled to the crossbar switch.

4. A programmable motion estimation module as in claim 2, wherein the processing element of the plurality of processing elements further comprises a coupling register for storing said second pixel value.

5. A programmable motion estimation module as in claim 4, wherein the processing element of the plurality of processing elements further comprises a first multiplexer operable to couple said second input of the plurality of processing element inputs to one of the crossbar switch and a coupling register of another processing element.

6. A programmable motion estimation module as in claim 4 wherein the first input of the plurality of processing element inputs is coupled to the crossbar switch and the second input of the plurality of processing element inputs is coupled to the coupling register of another processing element.

7. A programmable motion estimation module as in claim 6, wherein the plurality of processing elements are coupled in series.

8. A programmable motion estimation module as in claim 2 wherein the processing element of the plurality of processing elements further comprises:
   a first interpolation element operable to calculate a first interpolated value from a pair of adjacent pixels;
   a second interpolation element operable to calculate a second interpolated value from a pair of adjacent pixels;
   a third interpolation element operable to calculate a third interpolated value from said first and second interpolated values;
   a second multiplexer operable to select said first input of the plurality of processing element inputs to be one of a value from the crossbar switch, the first interpolated value and the third interpolated value.

9. A programmable motion estimation module as in claim 1, wherein said direct memory access unit is operable to generate automatically the addresses of pixel values stored in the memory subsystem in accordance with a programmed access pattern.

10. A programmable motion estimation module as in claim 1, further comprising a system interface element operable to couple the image data input of the memory subsystem and a scalar register of the plurality of scalar registers to a host video processing system.

11. A programmable motion estimation module as in claim 10, further comprising an instruction memory for storing instructions, wherein the system interface element is operable to transfer program instructions from a host video processing system to the instruction memory.

12. A programmable motion estimation module as in claim 1, further comprising
   a first arithmetic unit coupled to at least two of the plurality of scalar registers of the scalar register file;
   a first conditional flag storage unit for storing flags resulting from the operation of the first arithmetic unit, said first conditional flag storage coupled to said microcontroller.

13. A programmable motion estimation module as in claim 12, further comprising
   a second arithmetic unit coupled to at least two of the plurality of control registers of the control register file;
   a second conditional flag storage unit for storing flags resulting from the operation of the second arithmetic unit, said second conditional flag storage unit coupled to said microcontroller.

14. A programmable motion estimation module as in claim 13, wherein said microcontroller comprises:
   a first memory operable to store program instructions;
   a program counter;
   a second memory operable to store a program instruction to be performed;
   a first instruction decoder; and
   a next address logic unit operable to determine the address of a program instruction to be performed, said next address logic unit coupled to the program counter, the first instruction decoder and the first and second conditional flags storage units and responsive thereto.

15. A programmable motion estimation module as in claim 14 configured as a three-stage pipeline, the stages being instruction fetch, instruction decode and execution and write-back.

16. A programmable motion estimation module as in claim 14, wherein the program instructions comprise a 10-bit opcode followed by 22 bits of additional information.

17. A programmable motion estimation module as in claim 14, wherein each of the program instructions is one of a computational instruction, a data transfer instruction, a branch instruction and a special instruction.

18. A programmable motion estimation module as in claim 1, wherein said memory subsystem comprises static random access memory and a virtual memory translation unit.

19. A programmable motion estimation module as in claim 18, wherein said virtual memory translation unit is operable to provide an abstract view of the static random access memory as two-dimensional space indexed by horizontal and vertical coordinates of a pixel.

20. A programmable motion estimation module as in claim 18, wherein said virtual memory translation unit is responsive to one or more control registers of the plurality of control registers in the control register file.

21. A programmable motion estimation module as in claim 18, wherein the static random access memory has at least 3424 entries, each entry being 6-bits.

22. A programmable motion estimation module as in claim 18, wherein the static random access memory is single-ported.

23. A programmable motion estimation module as in claim 18, wherein the static random access memory comprises:
a plurality of search window memory elements operable to store pixel values from a previous digital image;
a plurality of current macroblock memory elements operable to store pixel values from a macroblock within a current digital image; and
a plurality of boundary memory elements operable to store pixel values from a boundary of a previous digital image.

24. A programmable motion estimation module as in claim 1, wherein the crossbar logic unit is operable to process control bitmasks stored in control registers of the plurality of control registers.

25. A programmable motion estimation module as in claim 1, wherein the direct memory access unit is controlled through values stored in by operable to process control bitmasks stored in control registers of the plurality of control registers.

26. A programmable motion estimation module as in claim 25, wherein the direct memory access unit contains a plurality of DMA registers operable to control the functionality of the direct memory access unit, wherein said plurality of DMA registers are memory-mapped to control registers of the plurality of control registers in the control register file.

27. A method for estimating a motion vector relating a macroblock of pixels in a current digital image frame to a macroblock of pixels in a previous digital image frame, said method comprising:
storing a program of instructions in a first memory within a motion estimation module;
transferring pixel data from said previous digital image frame from a host processor to a second memory within said motion estimation module;
transferring pixel data from said current digital image frame from the host processor to the second memory within said motion estimation module;
operating a micro-sequencer to decode said program of instructions sequentially to obtain control signals;
configuring said motion estimation module in accordance with said control signals;
causing said motion estimation module to process the pixel data from said previous and current digital image frames in accordance with said control signals and thereby generate an estimated motion vector; and
transferring said estimated motion vector from said motion estimation module to the host processor.

28. A method as in claim 27, wherein said motion estimation module includes a systolic array, wherein an instruction of said program of instructions includes a bitmask and wherein said configuring comprises controlling the functionality of the systolic using said bitmask.

29. A method as in claim 27, wherein said motion estimation module includes a scalar processing element and wherein said configuring comprises controlling the functionality of the a scalar processing element in accordance with an instruction of said program of instructions.

30. A method as in claim 27, wherein said motion estimation module operates as a three-stage pipeline comprising Instruction Fetch (IF), Instruction Decode (ID) and Execution and Write Back (EX) stages.

* * * * *